Jan. 7, 1969    J. B. BROWN    3,420,416

LIQUID DISPENSING APPARATUS

Filed June 19, 1967    Sheet 1 of 2

JAY BENTON BROWN
INVENTOR

John D. Pope III
ATTORNEY

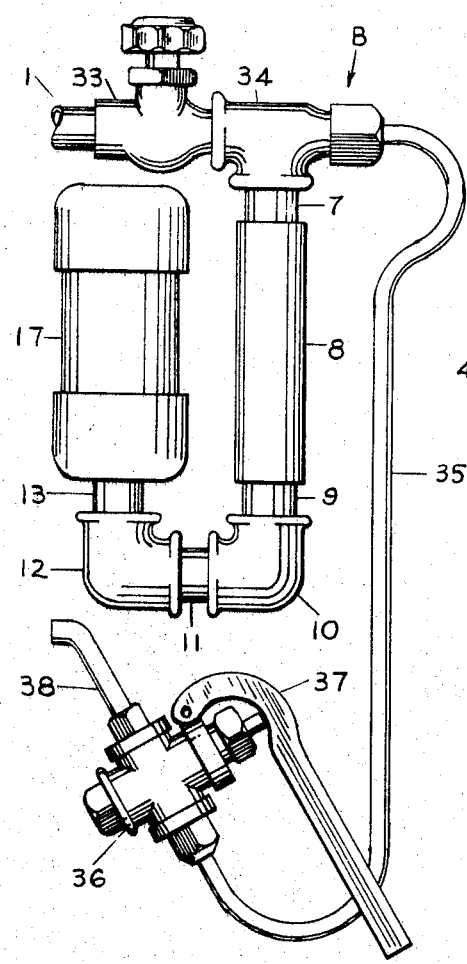
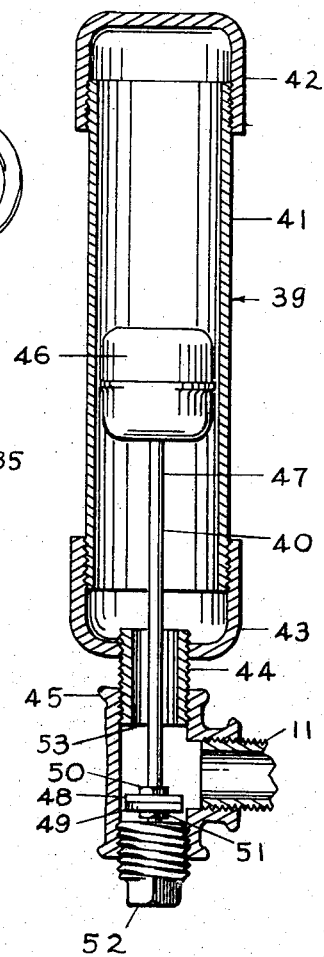
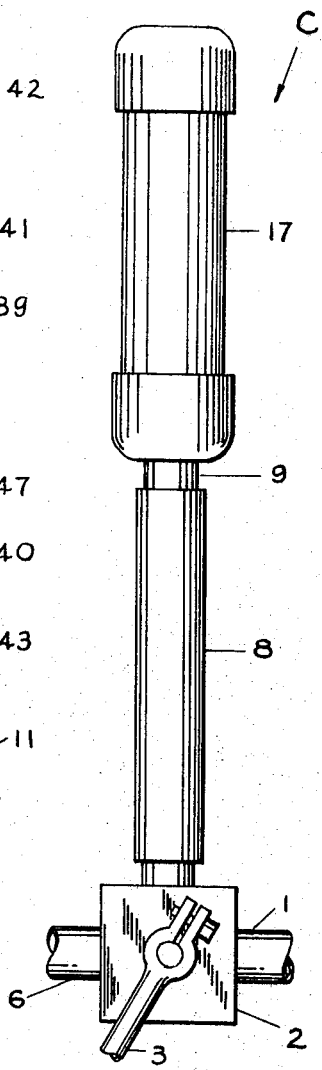
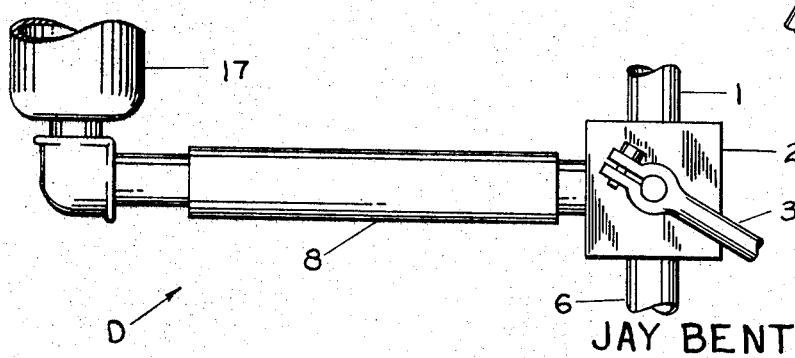

United States Patent Office 3,420,416
Patented Jan. 7, 1969

3,420,416
LIQUID DISPENSING APPARATUS
Jay Benton Brown, Bridgeton, Mo.
(93 Ford Lane, Hazelwood, Mo. 63042)
Filed June 19, 1967, Ser. No. 647,131
U.S. Cl. 222—335
Int. Cl. G01f 11/44
9 Claims

ABSTRACT OF THE DISCLOSURE

A liquid dispensing apparatus having a metering chamber which contains a shiftable metering element. One end of the metering chamber is provided with a valve seat against which the metering element seats so as to prevent liquid from flowing out of the chamber. Connected to the opposite end of the metering chamber is a sealed accumulator. Fluid from a pressurized source is introduced into the metering chamber through a valve located beyond the seat-containing end of the chamber. The valve moves from a charge position wherein it places the pressurized fluid in communication with the chamber, thereby partially filling the accumulator until the air entrapped therein is substantially equal in pressure to the pressure of the pressurized fluid to a delivery position wherein the valve places the chamber in communication with the atmosphere so that the pressurized entrapped air will force the fluid out of the accumulator and measuring chamber. As the fluid flows through the measuring chamber it propels the metering element along with it, and the metering element eventually seats on the valve seat, thereby terminating the delivery of a metered quantity of liquid. The metering element returns to its initial position by action of the incoming liquid when the valve is again turned to the charge position.

This invention relates to liquid dispensing apparatus, and more particularly to apparatus for dispensing measured dosages of a liquid.

The invention involves improvements over the liquid dispensing apparatus disclosed in United States Patents Nos. 2,705,094, 3,245,585, 3,229,862, 3,187,956 and 2,895,649, Re. 25,172.

In the case of all of the above cited patents, the liquid is measured by the action of a loosely fitting valve element enclosed within a tubular chamber, the valve element being adapted to measure liquid as it moves toward the delivery orifice in the end of the tubular chamber and upon contacting the orifice to stop the delivery of liquid from the apparatus. To recycle the apparatus, the valve element must be returned to its original position at the other end of the tubular chamber and this is accomplished by gravity or other biasing elements. Moreover, in returning, the valve element must move through a chamber full of the liquid and the viscosity of the contained liquid resists the return, necessitating a relatively large clearance between the valve element and the tubular chamber. This clearance contributes to inaccuracy of the apparatus as liquid measuring devices. Further, in the above cited patents, the movement of the valve element within the tubular chamber is due to and proportional to the pressure differential across the valve element within the tubular chamber. Changes in the pressure to the apparatus also contribute additional error in the measured dosage, requiring that liquid under a constant pressure be supplied to the apparatus.

Among the several objects of the present invention may be noted the provision of apparatus for delivering accurate measured dosages of a liquid; the provision of apparatus of the class described in which gas trapped within the apparatus is readily expelled by the ordinary operation of the apparatus; the provision of apparatus for dispensing liquids which reduces the possibility of an overdose to a minimum; the provision of apparatus of the class described which controls the delivery pressure of the liquid independently of the supply pressure; the provision of apparatus which reduces the pressure upon the liquid from the supply to the delivery point, yet subjects the liquid to minimal agitation, thus inhibiting foaming; and the provision of apparatus in which the tubular chamber contains a movable valve element which may be mounted in any attitude. Other objects and features will be in part apparent and in part pointed out hereinafter.

The invention accordingly comprises the constructions hereinafter described, the scope of the invention being indicated in the following claims.

In the accompanying drawings, in which several of various possible embodiments of the invention are illustrated, FIG. 1 is a view in elevation of a liquid dispensing apparatus constructed in accordance with and embodying the present invention;

Fig. 4 is an elevational view showing an alternative control valve arrangement;

FIG. 5 is a sectional view of a modified accumulator for controlling the delivery pressure;

FIG. 6 is a view in elevation of a modified form of dispensing apparatus; and

FIG. 7 is a view in elevation of another modified form of dispensing apparatus.

Corresponding reference characters indicate corresponding parts throughout the several views of the drawings.

Figure 1:
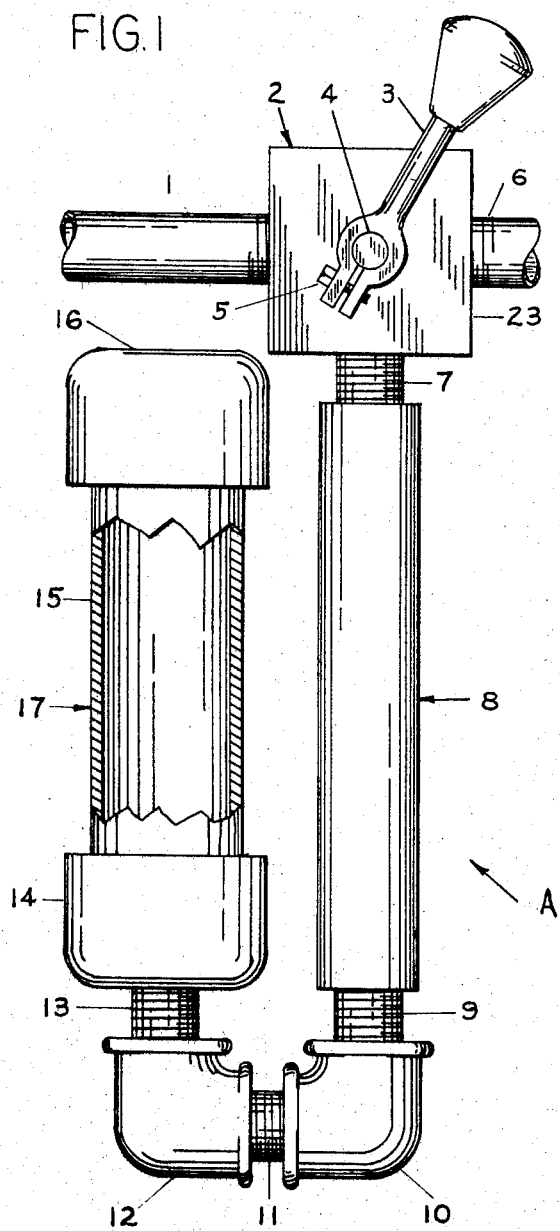

Referring to FIG. 1 of the drawings, A designates a liquid dispensing apparatus including a tubular supply conduit 1 adapted to receive liquid under pressure from a source (not shown) and to deliver it to a control valve 2 having a tubular delivery conduit 6 attached thereto and adapted to deliver measured dosages from the apparatus to a delivery point. Also connected to valve 2 by means of a nipple 7 is a metering chamber assembly 8 which is, in turn, attached to an accumulator 17 via a nipple 9, an elbow 10, a nipple 11, an elbow 12, and a nipple 13.

Control valve 2 (FIG. 2) is of conventional design, and it is sufficient to show that it comprises a body 23 having a cylindrical recess adapted to accept a rotating plug 22 provided with an arcuate cavity 19. Plug 22 has an axial extension 4 (FIG. 1) to which is attached a lever 3 which is secured by a screw 5. Lever 3 rotates plug 22 (FIG. 2), which fits the cylindrical recess of body 23 tightly, between charge and delivery positions. In the charge position plug 22 blocks a port 21 while establishing communication between ports 18 and 20 via cavity 19. When valve 2 is in its delivery position, port 18 is closed by plug 22 and communication is established between ports 20 and 21 via cavity 19.

Figure 2:
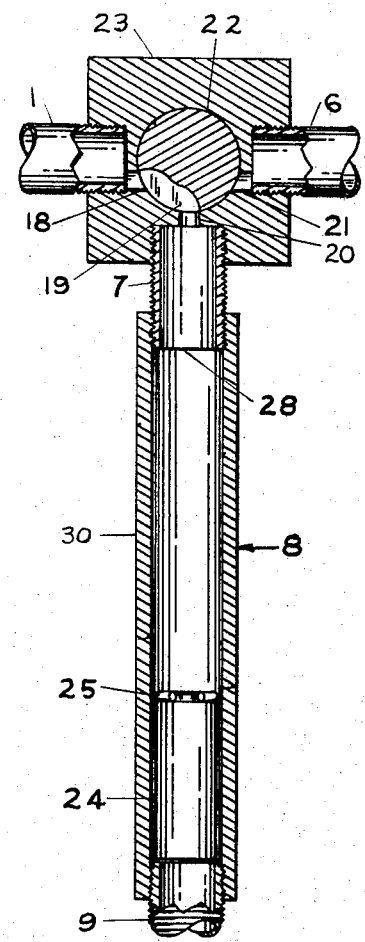
FIG. 2 is a fragmentary sectional view of the control valve metering chamber and metering element forming part of the present invention.

Metering chamber 8 (FIG. 2) comprises a tubular jacket 30 fitted at one end with nipple 7, having at its end within jacket 30 a smooth annular face 28 which is adapted to form a valve seat. At the opposite end of metering chamber 8 is nipple 9 which serves as a liquid conduit and as a stop for a movable metering element 24. Located within tubular jacket 30 and adapted to move between nipple 9 and nipple 7 is movable metering element 24 which may be solid as shown in FIG. 2. Metering element 24 is provided at one end with an elastomeric O-ring 25 retained by a protrusion 26 of a beveled side face 27. O-ring 25 is adapted to seat against smooth annular face 28 of nipple 7 so as to seal chamber 8 and prevent liquid from flowing out of it through nipple 7. Metering element 24 fits loosely within chamber 8 so that fluid can easily flow around it, and either it or nipple 9 are grooved at their point of contact so as not to restrict the flow of fluid into accumulator 17. The most accurate measurement, as well as the quickest response, can be obtained when metering element 24 possesses a specific gravity substantially equal to that of the fluid being measured. Nevertheless, dispensing apparatus A will perform quite satisfactorily and will deliver accurate dosages even when metering element 24 is considerably greater in density than the fluid.

Accumulator 17 is a sealed chamber comprising a nipple 15 having a cap 16 on its upper end and a reducer 14 on its lower end, the latter of which is threaded onto nipple 13.

Operation of dispensing apparatus A is as follows:

Tubular conduit 1 is connected to a source of liquid under pressure (not shown) such as a pressurized supply tank. The liquid enters control valve 2 through port 18 and passes through arcuate cavity 19 to port 20. The liquid flows through nipple 7, through metering chamber 8, around metering element 24, through nipple 9, elbow 10, nipple 11, elbow 12 and nipple 13. The incoming liquid enters accumulator 17 and compresses the gas (air) trapped therein.

When control valve 2 is moved by lever 3 to its delivery position, plug 22 closes port 18 and establishes communication between ports 20 and 21 via cavity 19, allowing liquid to leave the apparatus via port 21 and tubular conduit 6.

Because the pressure at delivery port 21 is lower than the pressure of the trapped gas in accumulator 17, the trapped gas forces liquid out of accumulator 17, through connective fittings 13, 12, 11, 10, and 9, into metering chamber 8. The liquid entering metering chamber 8 via nipple 9 causes movable metering element 24 to move toward nipple 7. When movable metering element 24 engages nipple 7, elastomeric O-ring 25 seats against annular face 28 of nipple 7, closing matering chamber 8 and arresting the flow of liquid from the apparatus.

When valve 2 is moved in the opposite direction to its charge position, plug 22 closes port 21 and establishes communication between ports 18 and 20 via cavity 19. Liquid from the supply tank then enters tubular conduit 1, passes through port 18, cavity 19, and port 20, and into metering chamber 8 via nipple 7. The liquid passes toward nipple 9 and moves movable element 24 toward nipple 9. Liquid passes through nipple 9, elbow 10, nipple 11, elbow 12, and nipple 13 into accumulator 17, repressurizing the trapped gas in preparation of delivery of another metered dose.

Figure 3:
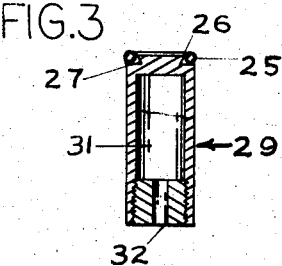
FIG. 3 is a sectional view of a modified metering element.

Referring to FIG. 3, it is possible to provide metering chamber 8 with a modified metering element 29 having a cavity 31 which communicates with chamber 8 through a port 32. Metering element 29 can be used in chamber 8 in lieu of metering element 24. As pressure within metering chamber 8 increases when valve 2 is in its delivery position, liquid is forced into port 32 of metering element 29 (FIG. 3) compressing gas trapped within cavity 31. When the amount of liquid within port 32 and cavity 31 increases, the buoyancy of metering element 29 decreases, causing it to sink to the bottom of metering chamber 8 and rest on nipple 9. When valve 2 is turned to its delivery position so as to decrease the pressure within metering chamber 8, the gas trapped within cavity 31 expands and forces liquid from metering element 29 via port 32. The movement of liquid from port 32 causes metering element 29 to rise due to its increased buoyancy and due to the reaction of mass moving out of port 32.

When control valve 2 is moved to its charge position, thereby placing metering chamber 8 in communication with the pressurized supply, the pressure within metering chamber 8 is increased causing metering element 29 to move toward nipple 9. When control valve 2 is moved to its delivery position so as to establish communication between metering chamber 8 and tubular conduit 6, the pressure within metering chamber 8 decreases, causing metering element 29 to move toward nipple 7. The weight of metering element 29 may be adjusted so that at a predetermined pressure it remains buoyant. Thus, the flow of liquid from the apparatus is arrested. When supply pressure is restored, the increased pressure of the liquid in metering chamber 8 causes liquid to enter cavity 31 via port 32, increasing the weight of metering element 29. This increased weight causes it to move under the influence of gravity plus the flow of liquid from nipple 7 to nipple 9. Metering element 29 with cavity 31 communicating with port 32 acts as a low pressure shutoff in the event of pressure decrease of the liquid supply.

Referring now to FIG. 4, it is possible to provide a modified dispensing apparatus B comprising tubular conduit 1 adapted to receive liquid under pressure from a source (not shown). Tubular conduit 1 is thredly attached to an adjustable restriction valve 33 which is threadedly fitted to a branch of a T-fitting 34. Also attached to T-fitting 34 is a flexible delivery line 35 which terminates at a remote delivery valve 36, and, in turn, is activated by a lever 37 to allow liquid to flow from a nozzle 38. Metering chamber 8 is attached to T-fitting 34 via nipple 7. Accumulator 17, nipple 13, elbow 12, nipple 11, elbow 10, and nipple 9, are connected as in dispensing apparatus A.

In operation, tubular conduit 1 is attached to a pressurized liquid supply. Valve 33 is opened enough to allow liquid to flow slowly from tubular conduit 1 to T-fitting 34 so as to fill line 35. Liquid also moves through nipple 7, metering chamber 8, nipple 9, elbow 10, nipple 11. elbow 12, nipple 13, and into accumulator 17 compressing the gas trapped therein. When delivery valve 36 is opened by lever 37, liquid is delivered from nozzle 38 and a pressure drop occurs in line 35. The gas trapped in accumulator 17 forces the liquid through fittings 13, 12, 11, 10, and 9. The liquid flows from nipple 9 to nipple 7 through metering chamber 8 and out of the apparatus via line 35, delivery valve 36 and nozzle 38. The flow of liquid through metering chamber 8 causes movable metering element 24 within metering chamber 8 to engage the annular face 28 of nipple 7, arresting the liquid flow from accumulator 17. However, the slow flow of liquid from the supply via tubular conduit 1 and valve 33 continues but issues from nozzle 38 considerably slower than the flow from accumulator 17. Thus the operator is signaled to release lever 37 of remote delivery valve 36. When valve 36 is closed, the slow flow of liquid through valve 33 repressurizes line 35, metering chamber 8 and accumulator 17, and moves movable metering element 24 back to nipple 9. Thus, the apparatus is reset for another delivery.

FIG. 5 shows an accumulator assembly 39 which can be used in lieu of accumulator 17. Accumulator 39 includes a float and valve assembly 40 adapted to control the amount of liquid that may enter accumulator 39. Thus, the remaining volume of gas trapped and compressed in accumulator 39 is controlled and the maximum pressure within accumulator 39 is limited. In particular, accumulator assembly 39 comprises a nipple 41 with a cap 42 threaded on the top, and a reducer 43 threaded on the bottom. A nipple 44 is threadedly fitted into reducer 43 and into T-fitting 45. Nipple 11 is threadedly fitted to the side arm of T-fitting 45 and connects to elbow 10, as shown in FIG. 1. Within accumulator 39 is a float 46. The top of a valve stem 47 is attached to the bottom of float 46. At the bottom end of valve stem 47 is an elastomeric disc 48 supported by a rigid disc 49. Discs 48 and 49 are secured to valve stem 47 by nuts 50 and 51. The float and valve assembly 40 rests on a plug 52 when accumulator 39 does not contain liquid. When the float and valve assembly 40 is raised by the buoyancy of the liquid in accumulator 39, elastomeric disc 48 engages in annular face 53 of nipple 44 and prevents the flow of additional liquid into accumulator 39. The length of valve stem 47 thus controls the amount of liquid which may enter accumulator 39.

With accumulator assembly 39 substituted for accumulator 17, operation is as follows:

Liquid under pressure from a source (not shown) enters the apparatus through tubular conduit 1, valve 2, nipple 7, metering chamber 8, nipple 9, elbow 10, nipple 11, T-fitting 45, nipple 13, and accumulator 17, and compresses the gas trapped within accumulator 39 until the liquid raises float 46 causing elastomeric disc 48 to engage annular face 53 of nipple 44, stopping the flow of liquid into the apparatus. When valve 2 is moved to its delivery position, the liquid within the apparatus is pushed out by the compressed gas within accumulator 39, causing O-ring 25 of metering element 24 to engage annular face 28 of nipple 7, stopping the flow of liquid from the apparatus. When valve 2 is returned to its charge position, the gas within accumulator 39 is recompressed by incoming liquid from the supply until float 46 raises and stops the flow of liquid into the apparatus. By controlling the volume of liquid which may enter accumulator 39, the maximum pressure of the gas trapped within accumulator 39 is controlled. Thus, the maximum pressure of liquid delivered by the apparatus is controlled. Accumulator 39 may be used with metering element 29 shown in FIG. 3 to control both the maximum and minimum delivery pressures.

FIG. 6 shows an alternative embodiment C of the apparatus in which the metering chamber 8, metering element 24, and control valve 2 are inverted.

FIG. 7 shows still another modified dispensing apparatus D in which metering chamber 8 and metering element 24 are placed horizontally.

In view of the above, it will be seen that the several objects of the invention are achieved and other advantageous results attained.

What is claimed is:

1. A liquid dispensing apparatus for use with a source of pressurized liquid; said dispensing apparatus comprising a tubular metering chamber connected to the source of pressurized liquid, a valve seat at one end of the metering chamber, a metering element shiftably mounted in the metering chamber and constructed so that fluid can pass by it within the chamber, the metering element being adapted to engage the valve seat and prevent liquid from flowing out of that end of the metering chamber, an accumulator connected to the opposite end of the metering chamber for receiving fluid from the pressurized source after it has passed through the chamber, the accumulator being constructed so that fluid entering it will entrap the gas therein and encompass it, a valve connected to the seat-containing end of the metering chamber beyond the valve seat, the valve being adapted to move from a charge position wherein pressurized fluid will pass into the metering chamber and partially fill the accumulator, compressing the air therein, to a delivery position wherein it exhausts the metering chamber so that pressurized fluid will flow through the metering chamber and thereby propel the metering element toward the valve seat, whereby a measured quantity of liquid will be discharged through the valve during the time it takes the metering element to move toward the valve seat and seat thereon.

2. A dispensing apparatus according to claim 1 wherein the metering chamber is substantially upright and the metering element is internally provided with a cavity which communicates with the interior of the metering chamber through a downwardly opening port.

3. A dispensing apparatus according to claim 1 wherein the valve comprises a first port connected to the source of pressurized fluid, a second port connected to the metering chamber beyond the valve seat therein, a third port, and shiftable means adapted to move between charge and delivery positions, the shiftable means establishing communication between the first and second ports while blocking the third port when in the charge position so that pressurized fluid can flow into the metering chamber, and establishing communication between the second and third ports while blocking the first port when in the delivery position so that fluid will flow out of the metering chamber.

4. A dispensing apparatus according to claim 1 and further characterized by a supply conduit in communication with the source of pressurized fluid at its one end and connected to the seat-containing end of the metering chamber at its opposite end, and a restriction in the supply conduit for impeding the rate of flow of fluid therethrough to an amount significantly less than the rate of flow through the valve when it is in its delivery position.

5. A dispensing apparatus according to claim 4 and further characterized by a delivery conduit interconnecting the seat-containing end of the cylinder and the valve.

6. A dispensing apparatus according to claim 1 and further characterized by a valve element adapted to move from an open position wherein the metering chamber and the accumulator are in communication to a closed position wherein the flow of fluid from the metering chamber to the accumulator is blocked, a float, and connecting means interconnecting the valve element and float for moving the valve element in response to movement of the float.

7. A dispensing apparatus according to claim 6 wherein a tubular conduit interconnects the lower end of the accumulator with the metering chamber; wherein a downwardly presented peripheral sealing face is located within the conduit; and wherein the valve element seats against the sealing face when in its closed position.

8. A dispensing unit according to claim 7 wherein the portion of the tubular conduit containing the sealing face is substantially vertical; and wherein a stem interconnects the valve element and float, the stem extending through the vertical portion of the tubular conduit.

9. A dispensing apparatus according to claim 1 in which the specific gravity of the valve element is substantially equal to specific gravity of the fluid being measured.

References Cited

UNITED STATES PATENTS

| Re. 25,172 | 5/1962 | Dawson | 222—318 |
| 1,454,765 | 5/1923 | Patterson et al. | 222—335 |
| 2,705,094 | 3/1955 | Howell | 222—335 |
| 2,741,404 | 4/1956 | Burton | 222—335 |
| 2,814,422 | 11/1957 | Mercier | 222—335 |
| 3,187,956 | 6/1965 | Dawson | 222—185 |
| 3,245,585 | 4/1966 | Dawson | 222—335 X |

WALTER SOBIN, *Primary Examiner.*